United States Patent [19]

Liberman

[11] Patent Number: 4,731,258

[45] Date of Patent: Mar. 15, 1988

[54] METHOD FOR APPLYING PLASTER AND CEMENT TO WALLBOARD AND THE LIKE

[76] Inventor: Isak Liberman, 9238 Barberry La., Des Plaines, Ill. 60016

[21] Appl. No.: 930,516

[22] Filed: Nov. 14, 1986

Related U.S. Application Data

[62] Division of Ser. No. 802,682, Nov. 29, 1985, Pat. No. 4,654,919.

[51] Int. Cl.[4] .......................... B32B 35/00; B05D 3/12

[52] U.S. Cl. .................................... 427/140; 427/277; 427/286; 427/369

[58] Field of Search ................. 15/104.5, 235.3-235.7, 15/245; 427/277, 286, 369, 140

[56] References Cited

U.S. PATENT DOCUMENTS

| | | | |
|---|---|---|---|
| 2,212,197 | 8/1940 | Roesch et al. | 15/236 R |
| 2,944,275 | 7/1960 | Markusen | 15/236 R |
| 2,968,057 | 1/1961 | Pratt | 15/104 S |
| 3,761,992 | 10/1973 | Schneller | 15/245 X |
| 3,878,581 | 4/1975 | Perma | 15/235.7 |
| 4,631,019 | 12/1986 | House | 15/145 X |

*Primary Examiner*—Evan K. Lawrence

*Attorney, Agent, or Firm*—Milton S. Gerstein; Marvin N. Benn

[57] ABSTRACT

A tool for spreading plaster, or the like, on wallboard surfaces which, in a first embodiment, includes a contoured surface having two end tip portions and a mid-portion contained in a plane spaced from the end tip portions. The tool includes a backing layer which gives structural integrity to the tool, and a flexible application-surface layer which projects beyond the outer edge of the backing layer. In use, the plaster is applied to the wallboard surface, and the projecting outer edge of the flexible layer is forced against the wall and pulled along to obtain a flat surface to spread the plaster out along the wallboard surface in an even and smooth manner to cover up cracks and tape. In a second embodiment, approximately half of the tool has a contoured surface, with the other half being planar. In this embodiment, the tool is used to distribute the plaster along the general wallboard surface area. This is accomplished by applying pressure to the planar portion to cause the plaster to spread outwardly between the curved portion of the tool and the adjacent wallboard surface. The tool is then used to smooth out that portion of the plaster positioned between the curved portion and the wallboard portion.

3 Claims, 6 Drawing Figures

METHOD FOR APPLYING PLASTER AND CEMENT TO WALLBOARD AND THE LIKE

This application is a division, of application Ser. No. 802,682, filed 11/29/85, U.S. Pat. No. 4,654,919.

BACKGROUND OF THE INVENTION

The present invention is directed to a method for spreading plaster, cement, spackle, or the like, upon wallboard. In the finishing operations of wallboard, tape is usually applied between adjacent blocks of wallboard. Thereafter, plaster is spread over the tape and over adjacent portions of the adjoining wallboard blocks, to thereby fuse together the previously separate blocks of wallboard. Thereafter, in the usual fashion, plaster or the like is applied over the entire wallboard surface area to provide a finished product. The conventional tool for the application of the plaster over the tape adjoining adjacent wallboard portions has been a simple straight knife made of metal. In using this conventional knife in the application and spreading of the plaster, it has taken usually three or four separate and distinct spreading steps in order to correctly and smoothly place the plaster over the tape and adjoining wallboard portions. The multiple-step operation has been necessitated by the fact that the knife in current use must first be used to apply a large amount of the plaster on the wallboard portions, thereafter spreading it in an uneven fashion and, after that, smoothing it out which, by itself, takes usually two or more separate operations. Thus, the actual spreading of the plaster or the like over the tape, adjacent wallboard portions, and the rest of the wallboard portions, has been tedious, time consuming and a multiple-step operation.

The very same knife that has been used to apply the plaster or the like to the tape and adjoining wall portions has also been used to apply spackle to fill in cracks in a wall before the painting of the surfaces. This also is a time consuming and multi-step operation, in the same manner as the above-described application of plaster to wallboard. In the application of the spackle to a crack, what is most important is to fill the crack with the spackle, and to thereafter insure that the wall portions adjacent on either side of the crack are made smooth. Using the conventional knife, this has been, as described above, a difficult task, since the application of the spackle is not done consistently and evenly over the crack and adjoining wall portions thereto.

SUMMARY OF THE INVENTION

It is the main objective of the present invention to provide a method for spreading plaster, cement, and spackle to wall surfaces such that the amount of time required to do so is considerably shortened, the number of steps in order to accomplish the spreading is considerably reduced, and the final smoothing out thereof is made more even and smooth.

It is another objective of the present invention to provide such a spreading method for the application of cement, plaster and spackle to wall surfaces such that it may be done in a very simple, easy and efficient manner.

It is still another objective of the present invention to provide a spreading method for applying plaster, cement and spackle to wall surfaces such that the actual spreading and smoothing out may be accomplished in substantially one independent step.

It is yet another objective of the present invention to provide such a spreading method that uses a tool that is easy to manufacture, and is durable and long lasting.

It is another objective of the present invention to provide a spreading method for the application of cement, plaster, or the like on flat wall surfaces in order to finish them in a more expedient, faster and easy manner.

Toward these and other ends, the spreading method of the present invention utilizes, in a first embodiment thereof, a tool having concave application-surface by which the plaster, or the like, is applied to the wallboard surface. The concave curvature of the application-surface allows for the substantial application of quite an amount of plaster to the wallboard surface, which thereafter may be applied by one stroke and smoothed out by pressing in along the concave surface, so that the protecting forward edge of the application-surface substantially takes a flat planar shape to, thus, firstly spread out the plaster during any stroke of the tool thereof and, at the same time, distribute the plaster in a uniform and smooth manner over the wallboard surface. The application-surface is preferably made of a flexible plastic, which layer of flexible plastic is backed by a reduced-height layer of rigid plastic to give the flexible plastic layer support, both layers being mounted to a handle for the gripping thereby. The application-surface layer may also be made of an appropriate metal that may be bent upon the application of sufficient force in the manner above-described.

In a second embodiment of the invention, the application-surface is provided with a first straight, flat-portion surface, and a second concave-shaped surface by which the plaster may be spread out evenly and more easily over the major portions of the wallboard requiring plaster thereover. When using this application-surface having one portion thereof concave, a substantial amount of plaster is first placed on the application-surface along the major portion thereof and, thereafter, a stroke is applied to the tool with the plaster thereon onto the wallboard by which the portion along the straight, flat-portion of the application-surface is smoothed out along the wallboard surface thereunder, and also is caused to spread out under the concave surface of the application-surface, to thereby not only apply the plaster to the wallboard portion directly under the concave surface of the application-surface, but also to thereby smooth it out in a level and even manner. In this second embodiment, the application-surface layer is either made of flexible plastic or a suitable flexible metal, while the backing layer is also provided of similar shape and made of either a more rigid plastic or more rigid metal. A handle portion s also provided in the second embodiment as in the first embodiment.

BRIEF DESCRIPTION OF THE DRAWING

The invention will be more readily understood with reference to the accompanying drawing, wherein.

DETAILED DESCRIPTION OF THE INVENTION

Figures 1, 2, 3, 4, 5, 6:
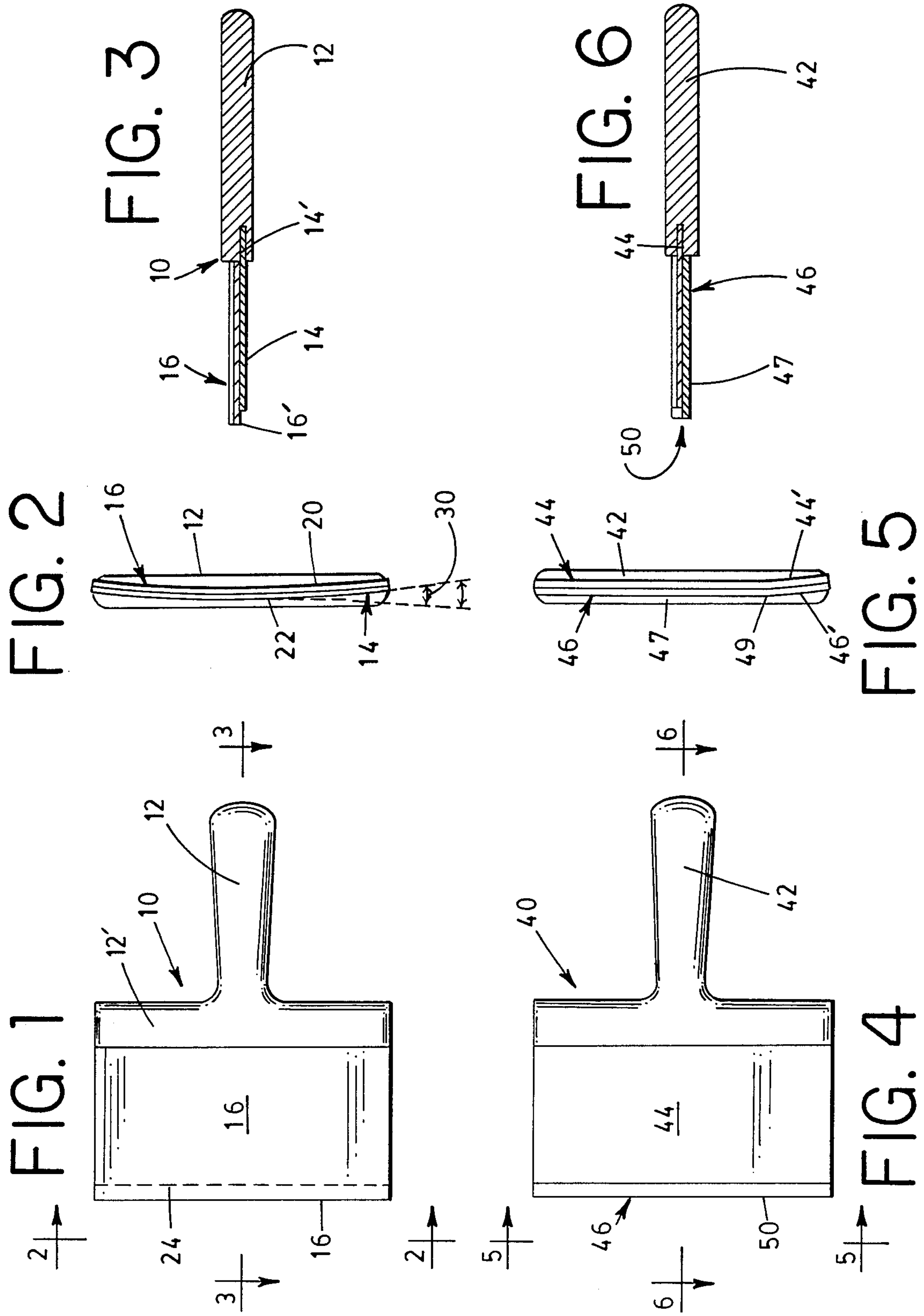
FIG. 1 is a top plan view of the spreader tool and in the method of the present invention.
FIG. 2 is a side-elevational view taken along line 2—2 of FIG. 1.
FIG. 3 is a cross-sectional view taken along line 3—3 of FIG. 1.
FIG. 4 is a top plan view of the spreader tool of the present invention according to a second embodiment thereof.
FIG. 5 is a side-elevational view taken along line 5—5 of FIG. 4.
FIG. 6 is a cross-sectional view taken along line 6—6 of FIG. 4.

Referring now to the drawings in greater detail, the spreading tool for spreading plaster, and the like, on wallboard is indicated generally by Reference Numeral 10 in FIGS. 1 through 3. The tool shown in FIGS. 1 through 3 constitutes the first embodiment of the present invention. The tool 10 includes a handle portion 12 in the conventional manner by which a hand may grip the tool. The forward front portion 12' of the handle mounts a first supporting or backing layer 14 by which a tool application-surface layer 16 is given structural integrity. The rear portion 14' of the backing layer 14 is fixedly mounted within the front portion 12' of the handle 12, as clearly shown in FIG. 3. The backing layer 14 constitutes a first laminate of the blade structure of the present invention. The application-surface layer 16 is fixedly connected to the upper portion of the backing layer 14 by any conventional means, to thus form a two-layer laminate. The forward or front portion 16' of the application-surface layer 16 projects outwardly beyond the forward edge surface of the backing layer 14 as clearly shown in FIGS. 1 and 3. This forward projecting front portion 16' of the upper layer 16 constitutes the plaster, cement or spackle smoothing surface for applying same to a wallboard or the like. The application-surface layer 16 is made of a flexible plastic in the preferred embodiment, although a thin, flexible and appropriate metal may be used. For example, this application-surface layer may be made of ⅛th inch silicone rubber, or may be made of urethane.

Each of the layers 14 and 16 is curved such that, when viewing FIG. 1, each layer 14 and 16 projects out of the plane of the page. For purposes of description, such curvature shall be termed concave, since it is being viewed from above the plane of FIG. 1. In FIG. 2, such curvature is clearly shown. The center of the curvature for each of the layers 14 and 16 is about a plane substantially dividing the handle portion 12 longitudinally thereof when viewing FIG. 1. Such plane projects perpendicularly to the surface shown in FIG. 1 and into the page thereof. While, for purposes of description, the curvature of the layers 14 and 16 has been described as concave, it is to be understood that such curvature need not be perfectly concave but may be meniscus-shaped or the equivalent thereof, so long as there is an offset from the central longitudinal portion of the application-surface layer as compared to the end tips thereof. This allows for the projecting edge surface portion 16' to be flexed inwardly upon sufficient pressure thereto via handle 12, so that the central longitudinal portion lies lie co-planal with the end tips thereof when applying the plaster or the like to the wallboard in order to spread it out evenly, to thus form a flat edge-surface. The midsection of the flexible layer 16 is indicated by Reference Numeral 20 in FIG. 2, while the midsection of the backing layer 14 is indicated by Reference Numeral 22 in FIG. 2. Thus, it is within the scope and purview of the present invention to provide a curvature of the layers 14 and 16 that are parabolic or other arcuate extension.

When using the spreading tool of FIGS. 1 through 3, the plaster, or the like, is first emplaced upon the upwardly-facing surface of the application-surface layer 16, when viewing FIG. 3 which upwardly-facing surface is directed away from the layer 14. Thereafter, the upper surface of the layer 16 is placed against the wallboard at the portion thereof where the tape has been applied, or where the crack is located, and the handle is used to force in the central section of the projecting edge portion 16', so that the central portion thereof becomes co-planar with the tips of the layer 16 and coextensive therewith to form a flat, projecting surface. Thereafter, the tool is dragged along the wallboard surface, either vertically or horizontally or a combination thereof, with the application of sufficient pressure causing the edge portion 16' to force the plaster to fill in the crack or to cover the tape that had been applied, while simultaneously causing the plaster lying directly adjacent to the edge surface 16' to be forced to spread outwardly from the midsection of the layer 16, toward the tips, to cause it to be smooth and evenly distributed, all in one stroke. Thus, with just one stroke, the plaster is applied to the wallboard directly over a crack or tape, and simultaneously spread out on the plaster in an even and smooth manner. Thus, no additional applications or strokes of the tool are necessary to accomplish the application-spreading of the plaster at a crack or at a portion at which tape has been applied. The backing layer 14 is of sufficient stiffness and strength so as to prevent the flattening of the application-surface layer 16 other than at the edge surface 16' by which the plaster or the like is applied over the area to be worked and spread out smoothly therefrom. Regarding the curvature of the layers 14 and 16, such may take different forms as described above, with preferably the angle indicated by Reference Numeral 30 in FIG. 2 generally falling within the range of between 3 and 15 degrees, the angle 30 being subtended by the tangent to the midsection portion 22 of the layer 14 and a tangent to the outer tip portion of the same layer 14, as shown clearly in FIG. 2. The application-surface layer 16 is preferably made of a flexible polyurethane plastic, although other flexible materials may be used therefor, with the thickness thereof preferably being within the range of between 1/16th of an inch and ⅛th of an inch. Sufficiently flexible metal may also be used therefor. The backing layer 14 may be made of any hard, substantially non-flexible plastic or metal. Since the backing layer 14 provides structural integrity to the flexible layer 16, the flexible layer 16 need not, in and of itself, be fixedly connected to the handle portion 12 in the manner that the backing layer 14 is, although such may be done within the scope and purview of the present invention.

FIGS. 4 through 6 shown a second embodiment of the invention. Whereas, in the embodiment of FIGS. 1 through 3, the spreading tool 10 was used to apply plaster, or the like, over tape joining two adjacent wallboard portions or for filling in cracks in a wall prior to painting, or the like, the embodiment of FIGS. 4 through 6 is used to spread the plaster, or the like, over the entire, whole wallboard surface when finishing the surfaces thereof. The spreader of the second embodiment is indicated by Reference Numeral 40 in FIGS. 4 through 6, and includes a handle portion 42 and a backing layer 44 to provide structural integrity to an application-surface layer 46. The backing layer 44 is mounted to the forward edge surface of the handle 42 in the same manner as described above in regards to the embodiment of FIGS. 1 through 3. The basic difference between the first embodiment and the second embodiment is the fact that, in the second embodiment, only approximately half of the layers 44 and 46 are contoured or curved, as indicated by Reference Numerals 44' and 46' in FIG. 5. Although in FIG. 5 it is shown that the curvature of each of the layers 44 and 46 of the laminate starts a distance somewhat spaced from the midsection of each of the respective layers thereof, it is within the scope and purview of the present invention to allow such curvature from the substantial mid-longitudinal section of each respective layer, in a manner shown in FIG. 2 of the first embodiment. Further, the use of the tool 40, as above described, is to spread the plaster, or the like, over the normal wall surfaces of the wallboard, exclusive of the places where there is located a crack or adjacent to areas where the tape has been applied to connect to adjacent wallboard surfaces. Thus, where in the first embodiment the layers 14 and 16 are used such that the midsection of surface 16' is urged toward the wall to thereby spread out the plaster between it and the adjacent wall surface portion, the tool 40 is used such that the curved surfaces 44' and 46' project away from the wall portion over which the tool 40 is applying the plaster thereto. That is to say, when using the tool 40, the plaster is first applied to the outer surface of the layer 46, which outer surface is that surface facing away from the backing layer 44. After the plaster has been applied to the outer surface of layer 46, the tool is then brought toward the wallboard surface such that the outer surface, indicated by Reference Numeral 47, faces toward the wall surface. In this orientation, the curved surface 46' projects away from the wallboard surface. Thus, as the surface 47 applies the plaster to the wall, as sufficient pressure is applied against the wall, the plaster is caused to spread outwardly toward the space formed between the adjacent wall surface and the curved surface 46', to thereby extend the plaster to a larger area of the wall surface portion, while simultaneously allowing such to be smoothed out. This operation is continued along parallel portions of the wallboard surface until the entire wallboard surface is covered with the plaster, such procedure also, as described above, simultaneously achieving the smoothing out of the plaster on the wallboard surface. Thus, for example, after one strip of plaster has been applied to the wallboard surface, where the plaster is forced outwardly between the space between the surface 46' and the adjacent wallboard surface, the worker will then start a second strip at that portion where the plaster was caused to flow between the surface 46' and the adjacent wallboard surface from the previously adjacent strip, thereby causing that agglumeration of plaster to be smoothed out, and to cause continuation of the spreading of the plaster along the wallboard surface. Thus, each parallel and adjacent strip of applied plaster contains contiguous portions, or overlapping portions thereof, by which the previously-applied plaster between the surface 46' and the wallboard section becomes the starting point for the next adjacent strip of application of plaster. The curved surface 46', before the removal of the tool from the strip of plaster being applied, may be used to flatten or smooth out a large agglumeration of plaster at the very edges of the strip, by rotating or rolling the tool such that the surface 46' contacts the wall surface portion directly adjacent thereto, thereby creating a pivot about the beginning portion of the surface 46', indicated by Reference Numeral 49 in FIG. 5. This, in effect, smoothes out the large portion of the plaster between the surface 46' and the adjacent wall surface, thereby effectively only leaving a very small agglumeration of plaster directly adjacent and exterior of the outer edge surface and end of the curvature 46'. It is that agglumeration of plaster exteriorly positioned of the edges of the surface 46' that constitutes the starting point of the next parallel and directly-adjacent applied strip of plaster. For this reason, the tool 10 is preferably made of the same materials as that indicated above with regards to the tool 10. That is to say, the outer application-applying surface 46 is made of the same flexible material as the layer 16 of tool 10, so that it may be contoured to the shape of the wall in order to smooth out the very large agglumeration of plaster accumulated between the portion 46' and the adjacent wall portion. The projecting surface 50, like surface 16' of the first embodiment, accomplishes this end.

The curvature of the surfaces 44' and 46' preferably lie within the same range as that indicated above with regard to the tool 10. However, in the embodiment of FIGS. 4 through 6, the curvature may be made even greater than that practicable with the tool of FIGS. 1 through 3. It is to be understood, of course, that the degree of curvature depends upon the size of the tool 10 or 40 being used, and the type of operation to which the tools are being used, and also the type of material being applied to the wallboard surface. The curvature of portions 44' and 46' may be parabolic, meniscus and the like.

While specific embodiments of the invention have been shown and described, it is to be understood that numerous changes, alterations and modifications thereof may be made without departing from the scope, spirit, and intent of the invention as defined in the appended claims.

What is claimed is:

1. A method of applying plaster, or the like, to wallboard surfaces, or the like, in order to plaster over tape adjoining two adjacent wallboard-surface portions, or to plaster over cracks in the wallboard surfaces, comprising:
   (a) applying plaster onto one face of a member having at least one contoured surface portion such that the curvature thereof projects toward the wall surface portion to which the plaster is to be applied, such that the end-edge tips of the surface portion lie closer to the wall surface portion than the mid-portion of the contoured surface thereof;
   (b) applying pressure to the other face of the member remote from the one face facing toward the wall surface portion to which the plaster is to be applied;
   (c) said step of applying pressure comprising urging the mid-portion of the outer edge-surface of the member toward the directly adjacent wall surface portion, so that the mid-portion lies substantially within the same plane as the end edge-tips of the outer edge surface of the member; and
   (d) moving the member along the surface portion of the wall to thereby apply the plaster to said wall surface portions to thus simultaneously smooth out the plaster thereon.

2. The method according to claim 1, wherein said step (a) comprises the step of initially applying the plaster onto the wallboard surface portion that is to be plastered in an agglumeration to be subsequently smoothed out by said step of applying pressure to the other face of the member.

3. A method of distributing plaster across a wallboard surface, or the like, comprising:

(a) applying plaster to the planar position of the surface of a member comprising a partially-planar, partially-contoured surface;

(b) positioning the surface such that the contoured portion thereof curves away from the wall portion to which the plaster is to be applied;

(c) applying pressure to the surface to cause the plaster to contact the wallboard surface directly adjacent thereto;

(d) said step of applying pressure being such that the plaster on the planar surface contacts the wallboard surface, with the contoured surface portion of the member being spaced from the wallboard surface, and causing the plaster to spread outwardly between the contoured portion of the member and the adjacent wall portion;

(e) rolling the member about the origin of the contoured portion thereof so that the contoured portion comes into contact, along a substantial portion of the length thereof, with the wall surface directly adjacent thereto;

(f) said step (e) comprising applying force to the member to cause the plaster between the contoured portion and the adjacent wall surface portion to be spread out evenly thereby; and (g) moving the surface along the wall portion to provide a strip of plaster therealong.

* * * * *